Patented Jan. 14, 1947

2,414,259

UNITED STATES PATENT OFFICE 2,414,259

TREATMENT OF HYDROCARBON MATERIALS

Melvin M. Holm, San Francisco, Calif., assignor, by mesne assignments, to California Research Corporation, San Francisco, Calif., a corporation of Delaware No Drawing. Application July 3, 1944,
Serial No. 543,414

11 Claims. (Cl. 260—683.4)

This invention relates to the treatment of hydrocarbon materials. More particularly, it relates to the removal of combined fluorine from hydrocarbon materials, and especially to the removal of such fluorine present in hydrocarbons and resulting from the use of a fluorine-containing catalyst.

When hydrocarbon materials are treated with fluorine-containing catalysts, small amounts of organic products containing fluorine are produced. This is the case, for example, when fluorine-containing catalysts are used to effect such reactions as alkylation, isomerization and polymerization of relatively low boiling hydrocarbons to produce hydrocarbons useful for motor fuel. Examples of such fluorine-containing catalysts are hydrofluoric acid and boron trifluoride. Just what these fluorine-containing products are is not definitely known, but evidence indicates that they are alkyl fluorides. It is found that they are not completely removed by washing with alkali solutions and they tend to decompose at elevated temperatures to produce corrosive hydrofluoric acid, which is very undesirable in a motor fuel product.

It is an object of this invention to remove such undesirable organic fluorine compounds from hydrocarbon materials.

Another object of this invention is to produce, by a process utilizing fluorine-containing catalysts, normally liquid hydrocarbons suitable for motor fuel and free of undesirable organic fluorine compounds.

Other important objects of this invention will be apparent from the following disclosure.

In accordance with this invention, such organic fluorine compounds are removed from hydrocarbon materials containing them by treatment with a treating agent comprising lime. The lime may be in the form of essentially pure calcium oxide or relatively impure commercial grades of lime, preferably free of or low in silicon-containing materials. To lessen caking of the lime and any tendency to carry water to equipment other than that used for the lime treatment in accordance with this invention, the treating material comprising the lime is preferably at least partially freed of water prior to use. This can be accomplished by heating to temperatures as high as 1100 to 1200° F. The exact mechanism involved in the removal of fluorine from organic material in accordance with the process of this invention is not fully known. One possible explanation is that a hydrogen fluoride molecule is split from an alkyl fluoride by combination with the calcium oxide of the lime, thus changing the alkyl fluoride to an olefin.

Treatment of organic fluorine-containing hydrocarbons in accordance with this invention may be effected in either the liquid or the vapor phase. Temperatures between about 100 and 700° F. may be employed for removing organic fluorine compounds in accordance with this invention, and it is found that most effective removal will usually be accomplished at the higher temperatures of this range. The temperature of treatment, however, is dependent upon the liquid space velocity of the hydrocarbon material being treated, and usually when a high space rate is desired a higher temperature will be found most effective. For the space rates desirable for commercial operations temperatures between 200 and 500° F. are preferred. Furthermore, the temperatures will depend to some extent on the activity of the lime treating agent at any particular time of use and it is, of course, desirable to maintain the temperature below that which will cause undesirable reactions in the hydrocarbons being treated. High liquid feed rate such as, for example, 10 or more volumes of hydrocarbon material per volume of lime treating agent per hour is satisfactory for temperatures in the high part of the range of 100 to 700° F. When lower temperatures are used, a longer contact time and lower space velocity will be found suitable, for example, at temperatures from 100 to 200° F. a space velocity as low as about 2 may be found satisfactory. In general, the liquid space rate at which the treatment is effected depends upon the fluorine content of the hydrocarbon material being treated, the relative amount of such fluorine compounds which are to be removed, and to some extent the pressure, as well as the temperature of treatment.

Pressures from atmospheric to around 500 pounds per square inch will usually be found satisfactory in the practice of this invention, although higher pressures may be used if desired, for example, up to about 2,000 pounds per square inch. However, it is preferred to effect the treatment in accordance with this invention at relatively low superatmospheric pressure such as between 100 and 400 pounds per square inch.

Example 1

A hydrocarbon product obtained from the alkylation of isobutane with a pentene fraction using hydrofluoric acid as the catalyst, substantially free of any dissolved hydrogen fluoride, and containing 0.019% of fluorine as undesirable fluorine-containing products was passed over 4 to 10 mesh lime, which had been previously calcined at 1100 to 1200° F., in an electrically heated chamber, in accordance with the conditions shown in the following table:

| Run | Pressure | Temperature | Space rate | Fluorine after treatment | Per cent fluorine removed |
|---|---|---|---|---|---|
| | | ° F. | | | |
| 5A | 200 | 150 | 10 | 0.002 | 89 |
| 5B | 200 | 350 | 10 | 0.001 | 95 |

The pressure in the table above is given in pounds per square inch gauge. The space rate is the volume of liquid hydrocarbon per volume of treating agent per hour. The column headed "Fluorine after treatment" gives the weight per cent of fluorine remaining in the hydrocarbon after treatment. The last column headed "Fluorine removed" gives the weight per cent of fluorine removed by the treatment.

The treated material was collected and analyzed for its content of organic fluorine. The data in the table above show that substantially all of the fluorine-containing compound was removed by the treatment in accordance with this invention. Should it be desired to further remove organic fluorine compounds, the hydrocarbons once treated as above may be further treated under similar conditions, preferably at a somewhat higher temperature or lower space rate.

Example 2

Another hydrocarbon product obtained from the alkylation of isobutane using hydrofluoric acid as catalyst, freed of dissolved hydrogen fluoride, and containing 0.024% fluorine as organic fluorides, are treated with lime as in Example 1 at 350° F. and 200 pounds per square inch gauge using a liquid hydrocarbon feed rate of 2.5 volumes per volume of lime per hour. During the course of and even after 83 hours of operation the fluorine removal was over 97% and after the 83 hours there was no indication of a decline in treating efficiency. Moreover, under these conditions no deterioration of the product occurred. Notably, the octane number of the $C_5$-free gasoline fraction was substantially the same as the octane number of this same fraction before treatment.

The foregoing examples clearly illustrate the desirable results obtained by the use of this invention as disclosed above.

Although, as pointed out above, lime is the preferred defluorinating agent for the practice of this invention, magnesium oxide and dolomite heated to transform carbonate to oxide by removal of carbon dioxide may be used. Mixtures of any of the foregoing materials may also be used. Also, mixtures of these materials with such other substances as bauxite are also satisfactory.

Having thus described my invention, I claim:

1. A process for treating hydrocarbon materials to remove combined fluorine which comprises subjecting hydrocarbon material containing a relatively minor quantity of combined fluorine to the action of a treating agent comprising an oxide of a metal selected from the group consisting of calcium and magnesium, at a temperature within the range 100° F. to 700° F.

2. Process as defined in claim 1, in which said metal is calcium.

3. Process as defined in claim 1, in which said metal is magnesium.

4. Process as defined in claim 1, in which said treating agent comprises dolomite heat treated to transform carbonate to oxide.

5. Process as defined in claim 1, in which said treating agent comprises a mixture of calcium and magnesium oxides.

6. Process as defined in claim 1, in which said treating agent comprises a mixture of bauxite with an oxide of magnesium.

7. Process as defined in claim 1, in which said treating agent comprises lime.

8. A process for removing organic fluorine-containing compounds from a mixture of paraffinic hydrocarbons boiling in the motor fuel range and containing a relatively small quantity of such fluorine-containing compounds, which comprises contacting the mixture with a defluorinating agent comprising lime under conditions effective to remove fluorine-containing compounds.

9. In a process for producing paraffinic hydrocarbons boiling in the motor fuel range by the alkylation of low boiling isoparaffinic hydrocarbons with normally gaseous olefins using a hydrofluoric acid alkylation catalyst, the improvement for producing a motor fuel product substantially free of organic fluorine-containing compounds, which comprises subjecting the motor fuel product resulting from said alkylation reaction to treatment with an agent effective to remove such organic fluorine-containing compounds comprising a metal oxide selected from the group consisting of calcium and magnesium, at a temperature within the range 100° F. to 700° F.

10. Process as defined in claim 9, in which said treating agent comprises lime.

11. Process for treating hydrocarbon materials containing organic fluorine-containing products resulting from treatment of hydrocarbon materials with a fluorine-containing catalyst to remove such organic fluorine-containing products, which comprises subjecting said hydrocarbon materials to the action of a defluorinating agent comprising an oxide of a metal selected from the group consisting of calcium and magnesium under conditions effective to remove organic fluorine-containing products.

MELVIN M. HOLM.